United States Patent [19]
Hashoff et al.

[11] 3,906,149
[45] Sept. 16, 1975

[54] INSULATOR FOR HIGH-VOLTAGE, METAL-CLAD SWITCHING AND TRANSMISSION INSTALLATIONS

[75] Inventors: Lothar Hashoff; Günther Luxa; Joachim Thürk; Armin Diessner, all of Berlin, Germany

[73] Assignee: Siemens Aktiengesellschaft, Munich, Germany

[22] Filed: Mar. 13, 1974

[21] Appl. No.: 450,882

[30] Foreign Application Priority Data
Mar. 21, 1973 Germany............................ 2314675

[52] U.S. Cl. ................... 174/167; 174/28; 174/176; 174/212
[51] Int. Cl.² ......................................... H01B 17/56
[58] Field of Search .......... 174/16 B, 22 C, 28, 167, 174/176, 212; 200/148 R

[56] References Cited
UNITED STATES PATENTS
2,962,541  11/1960  Snader .................................. 174/18

*Primary Examiner*—Laramie E. Askin
*Attorney, Agent, or Firm*—Kenyon & Kenyon Reilly Carr & Chapin

[57] ABSTRACT

An insulator for completely insulated, metal-clad high-voltage switching installations includes a part in the shape of a hollow cone for concentrically supporting an electrical conductor. The insulator is provided on the conical surface with projecting concentric cylindrical structures arranged at a distance from each other.

3 Claims, 1 Drawing Figure

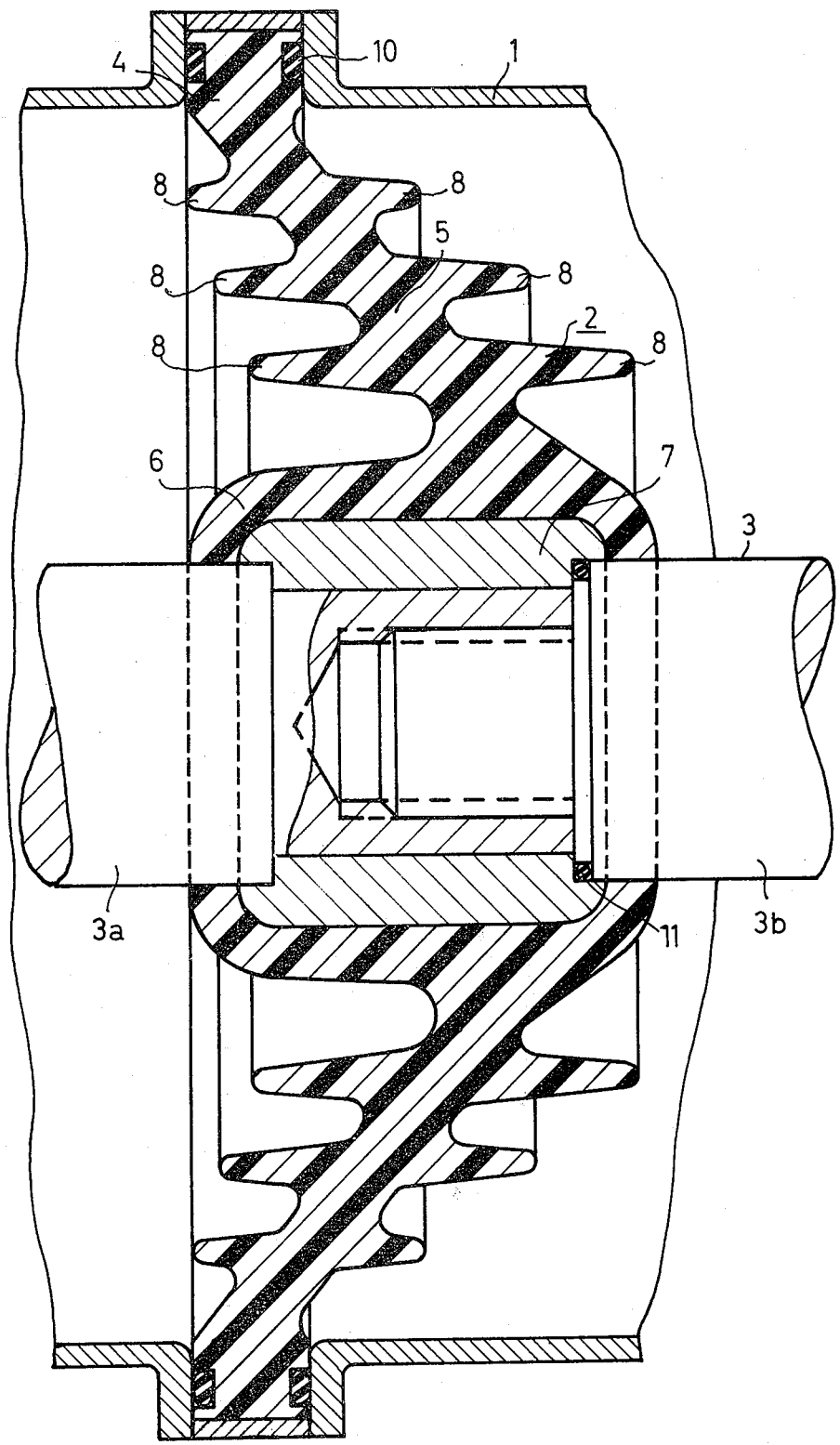

INSULATOR FOR HIGH-VOLTAGE, METAL-CLAD SWITCHING AND TRANSMISSION INSTALLATIONS

BACKGROUND OF THE INVENTION

The invention relates to an insulator for concentrically supporting an electrical conductor in an enclosed, gas-insulated, high-voltage switching and transmission installation. The insulator has an annular part for fastening the insulator at the tubular enclosure and has a central support part in the form of a hollow cone and a centered bushing made hollow to receive the conductor.

An insulator of this general type is disclosed, for instance, in Deutsche Auslegeschrift 1,285,584. This publication shows a support insulator which is attached coaxially in the tubular enclosure, preferably at the joints. The support insulator is constructed as a conical hollow body having at its apex a centered hole wherein the electrical conductor is supported.

In the construction of metal-clad, pressurized gas-insulated high-voltage switching and transmission installations, the trend is to transmit more electric power and to construct the tubular conductors and equipments accordingly for higher voltages, for example, for 110, 220, 380 or more kilovolts. The insulating gas used, for instance, sulfur hexafluoride, $SF_6$, has better insulating properties with increasing pressure so that higher voltages can be transmitted with the same cross-section of the enclosure and the conductor. The insulators are here frequently the weakest point of the installation and the equipment, as far as the dielectric properties are concerned. At higher voltages, problems furthermore arise due to unavoidable metallic or semiconductor particles which are influenced by the electric field and can lead to breakdowns.

If the known insulators are used as feedthroughs, a certain ratio of the voltage to the cross-section of the encapsulation must be observed.

SUMMARY OF THE INVENTION

It is an object of the invention to provide an insulator of the kind mentioned above wherein the ratio of the voltage to the cross-section of the enclosure is improved.

According to the invention, the object of the invention is realized by configuring the insulating supporting member as a conical hollow cone having a conical surface provided with projecting concentric cylinder structures spaced a distance one from the other.

The improvement of the mechanical and dielectric properties is accordingly achieved not by using a more expensive material of higher quality, rather, by providing a special configuration. Materials which can be used here are synthetic resins capable of polyaddition or polymerization, that is, epoxy-resin, unsaturated polyester resin and possibly also polyurethane resin, as is known per se in insulation and feedthrough technology. Such synthetic resins are described, for example, in Staeger "Werkstoffkunde", 1955, pages 381–397.

Of advantage in the insulator according to the invention is the fabrication of the support part in the form of a hollow cone in conjunction with the bushing and the mounting part as well as the cylindrical structures as one piece of a single material.

An improvement of the mechanical properties is obtained because the material in the insulator constructed according to the invention is stressed primarily in shear and not so much in flexure. The fact is therefore utilized intentionally that cast insulating materials, particularly epoxy resins, can stand high shear stresses, but have only limited bending strength.

An improvement of the dielectric properties is obtained, because with the configuration according to the invention, no continuous localized contamination can take place, particularly during the installation. Furthermore, the above-mentioned particles, which are influenced by the electric field, can be inhibited mechanically in their mobility. In addition, an improvement of the dielectric properties is obtained because the cylindrical parts act as an ion barrier.

In one preferred embodiment of the insulator according to the invention, the cylindrical structural portions are provided on the inside and the outside conical surfaces of the support part. The length of the projecting cylindrical structures can be, for instance, one to three times the wall thickness of the insulator.

In one advantageous embodiment of the insulator according to the invention the length of each cylindrical structure is at most half the height of the hollow, cone-shaped support part. In this manner, the space already occupied by the hollow cone-shaped insulator is not increased.

Although the invention is illustrated and described herein as an insulator for high-voltage, metal-clad switching and transmission installations, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWING

The drawing is a longitudinal view, partially in section, of the insulator according to the invention mounted in a tubular enclosure of a high-voltage installation.

DESCRIPTION OF THE PREFERRED EMBODIMENTS OF THE INVENTION

In the drawing, reference numeral 1 designates a tubular enclosure of a metal-clad, gas-insulated high-voltage switching and transmission installation. An insulator 2 concentrically supports the electrical conductor of the high-voltage installation with respect to the enclosure 1. The insulator 2 has a ring-like outer part 4 for fastening at the tubular enclosure 1. To the ring-like outer part 4 is joined a central support part 5 in the form of a hollow cone. The hollow cone-shaped support part 5 has at the center a centered bushing 6 which is made hollow to receive the conductor 3 and which is equipped with a metallic electrode 7.

The support part 5 is provided on the side of the conical surface with projecting concentric cylinder structures 8, which are provided on at least one side of the part 5. In the illustrated embodiment, the projections are on the inside and the outside at the conical surface of the support part 5. The concentric cylinder structures 8 form obstacles for the movement of particles which can move freely about in the electric field in an undesirable manner.

The length of the projecting cylinder structures 8 is one to three times the wall thickness of the insulator 2. The length of each cylinderical structure in the dimension extending parallel to the tubular enclosure is at most half the height of the hollow cone-shaped support part 2.

The hollow cone-shaped support part 5 is made, together with the bushing 6 and the mounting part 4 as well as the cylinder structures 8 as one piece of cast resin. The cast resin can be made up of an epoxy resin with filler. However, fiber-reinforced epoxy resins and unsaturated polyester resins as well as ceramic materials can also be considered.

If the insulator according to the invention is constructed as a gastight and arc-resistant feedthrough, the annular outer part 4 for fastening at the tubular enclosure is provided with sealing elements 10, so that the insulator represents a partition which divides the tubular enclosure 1 into two gas spaces. Also the parts 3a, 3b of the conductor 3 are provided with a seal 11. This seal 11 is effective because of the contact pressure of the parts 3a, 3b, which are screwed together.

The insulator of the invention makes it possible to improve the ratio of the high-voltage to the cross-section of the enclosure. This means on the one hand that, by utilizing the insulators according to the invention, higher voltages can be transmitted with a given enclosure cross-section, or for given voltages, the cross-section of the enclosures can be made smaller. In both cases, the configuration used in the insulator of the invention has the effect of lowering the costs for high-voltage switching and transmission installations.

What is claimed is:

1. An insulator for concentrically supporting an electric conductor within a gas-insulated, high-voltage switching and transmission installation having a tubular gas-tight enclosure, the insulator comprising: a hollow conical part having inner and outer conical surfaces, a ring-like part extending from said conical part for engaging the tubular enclosure for fixedly mounting the insulator therein; hollow bushing means centrally located at said conical part for receiving said conductor therein; and, a plurality of mutually concentric cylindrical-like projections formed on said outer surface arranged so as to be spaced one from the other, and a second plurality of mutually concentric cylindrical-like projections formed on said inner surface, said second plurality of projections being likewise arranged so as to be spaced one from the other, said cylindrical-like projections having a length corresponding to one to three times the wall thickness of the insulator.

2. The insulator of claim 1, said conical part defining a longitudinal axis, said cylindrical-like projections each having a length dimension extending in a direction parallel to said longitudinal axis, said length dimension being at most up to half the height of said conical part.

3. The insulator of claim 1, said ring-like part, said conical part, said bushing, and said projections all conjointly constituting a single member made of a synthetic resin.

* * * * *